J. J. HALLORAN.
CUTTING BLOCK FOR TRIMMING MACHINES.
APPLICATION FILED SEPT. 16, 1920.
1,407,268.
Patented Feb. 21, 1922.
2 SHEETS—SHEET 1.
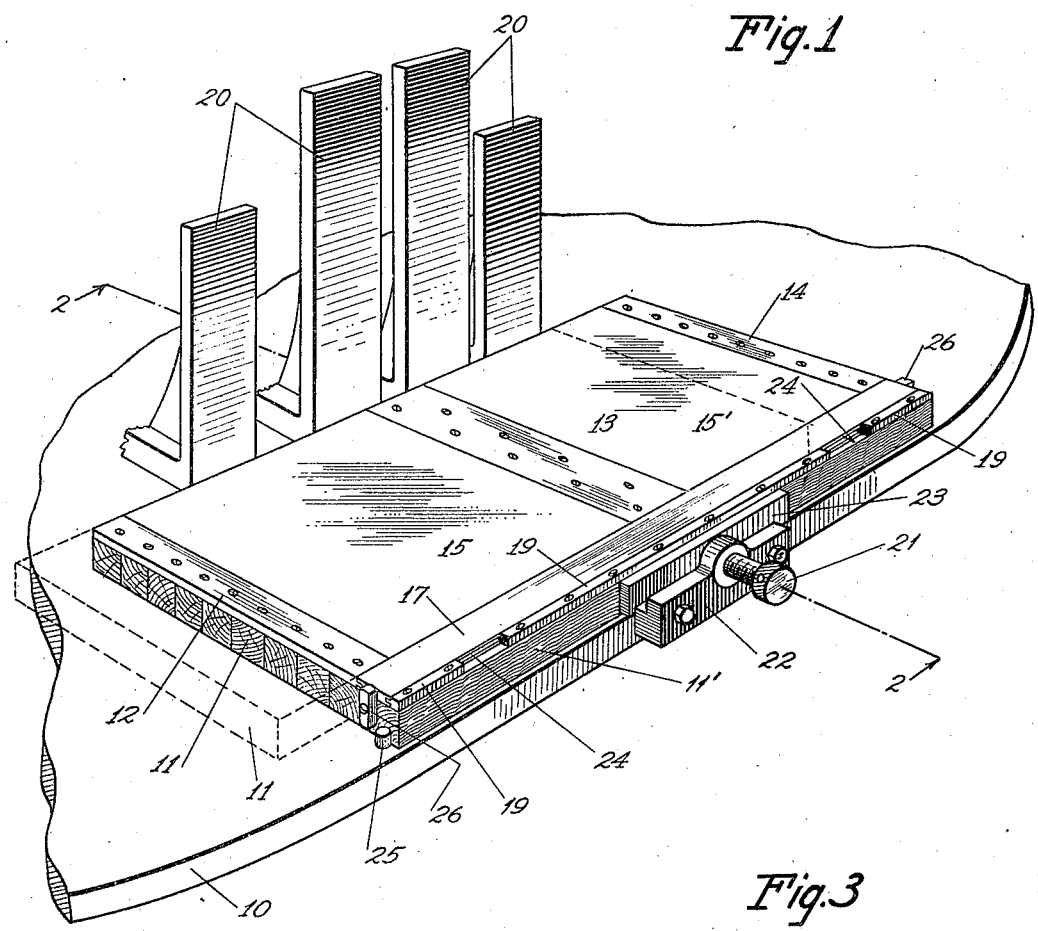
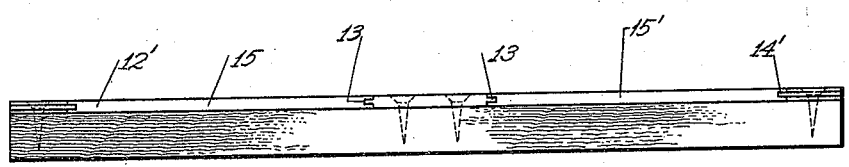
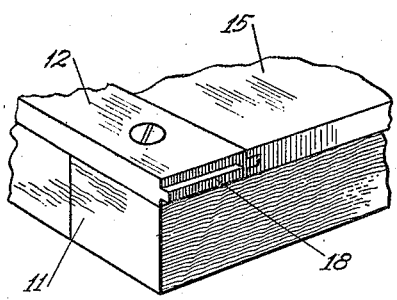
INVENTOR
John J. Halloran
BY
Jas. H. Griffin
ATTORNEYS J. J. HALLORAN.
CUTTING BLOCK FOR TRIMMING MACHINES.
APPLICATION FILED SEPT. 16, 1920.

1,407,268.

Patented Feb. 21, 1922.

INVENTOR
John J. Halloran
BY
Jas. H. Griffin
ATTORNEYS

UNITED STATES PATENT OFFICE.

JOHN J. HALLORAN, OF NEW YORK, N. Y.

CUTTING BLOCK FOR TRIMMING MACHINES.

1,407,268. Specification of Letters Patent. Patented Feb. 21, 1922.

Application filed September 16, 1920. Serial No. 410,706.

*To all whom it may concern:*

Be it known that I, JOHN J. HALLORAN, a citizen of the United States, residing in the city of New York, borough of Manhattan, county and State of New York, have invented a certain new and useful Cutting Block for Trimming Machines, of which the following is a specification.

This invention is a cutting block for trimming machines and is adapted, more particularly, for use on machines employed in the trimming of bound books, magazines or other publications, though, manifestly, it is adapted for general use and is not restricted to this particular environment.

The machines usually employed for the trimming of books, periodicals, publications, etc., embody reciprocating knives which are mechanically moved toward and away from a cutting table, and on this cutting table are superimposed stacks of books and magazines to be cut. As the power employed for this work is usually considerable and damage would result to the knives if brought into engagement with the metallic cutting table, it is the usual practice to mount a cutting block on the cutting table and pile the books to be cut upon such block. The present invention relates particularly to this cutting block.

The cutting blocks previously employed have been made of wood and are usually of the built-up structure of a number of square maple sticks about 1¼ inches square and ranging from 18 inches upward, in accordance with the size of books or magazines to be cut. These maple sticks are usually laid side by side and are clamped together to form a cutting block. The employment of sticks has been considered the best practice in the past for the reason that when one face of the block becomes badly cut up after a relatively short period of use, the sticks could be shifted a quarter turn to expose an uncut surface. In this way, a block may be changed four times so as to use the four sides of each of the sticks embodied therein. However, in practice, the life of a table in the manner described was unbelieveably short, and after the table had been badly cut up, the whole structure had to be thrown away and re-placed by a new one. This practice resulted in an appreciable cost of maintenance and, likewise, an appreciable consumption of time in the changing of the table and the re-arrangement of the sticks therein.

With these considerations in mind, the object of the present invention is to provide a cutting block embodying a removable facing adapted to take the wear and tear of the cutting operation and readily removable and replaceable after becoming unduly worn without necessitating an entirely new block.

A further object of the invention is to provide a cutting block having a removable cutting face, which block is adapted to be shifted from time to time so that practically the entire cutting face may be used up before discarding the same.

In the preferred practical embodiment of the invention, I preferably face the upper surface of the cutting block with a fibre plate, which acts as a cutting surface and which may be removed when desired or when worn out, and re-placed by a new and unworn plate of fibre. Features of the invention, other than those specified, will be apparent from the following description when read in conjunction with the following drawings.

In the drawings, I have illustrated one practical embodiment of the invention, but the construction therein shown is to be understood as illustrative only and does not define the limits of the invention.

Figure 1 is the fragmental perspective view of a portion of the cutting table of a trimming machine, showing the present invention associated therewith.

Figure 3 is a front elevation of the main portion of the cutting block shown in Figure 1.

Figure 4 is a perspective view, illustrating the left-hand corner of the block shown in Figure 3.

Figure 2:
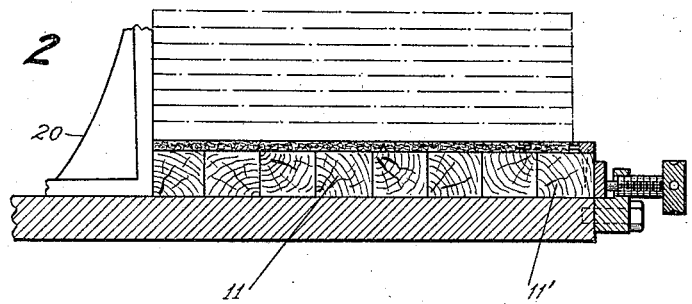
Figure 2 is a section on the line 2—2 of Figure 1.

While the present invention may be adapted for employment with any kind of machine, I have, for the purpose of illustration, chosen to show same as associated with one of the well-known Seybold trimmers. Such a machine, details of which are not shown in the drawings, comprises a circular table 10 at certain intervals around the margin of which the books to be cut are adapted to be stacked. Vertically reciprocating knives, not shown, are adapted to operate above the table for the purpose of cutting or trimming the books positioned at the several stations around the margin of the same. These knives are generally arranged so that two of them will cut the top and bottom of the book at one operation, while a third knife will cut the opening or front edge of the book at a subsequent operation. The machine itself forms no part of the present invention and is not considered necessary to show these features, as they are well known in the art. To the trade the knife which cuts the top of the book is referred to as a head knife; that which cuts the bottom of the book is called a tail knife, while that which trims the opening edge of the book is known as the front knife. This reference to the terminology employed in the trade is made so that the manner in which these several knives cooperate with the cutting block may be more readily understood.

Figure 5:
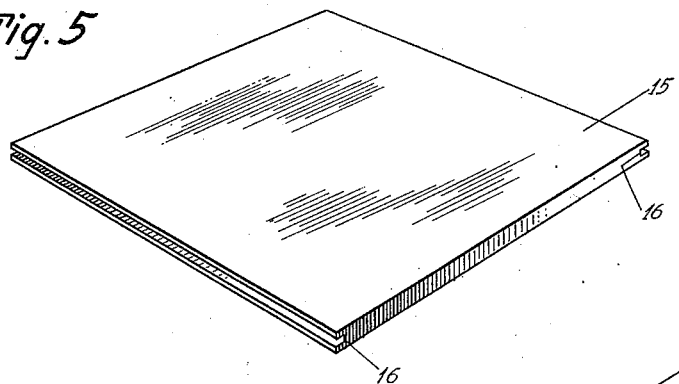
Figure 5 is a perspective view of one of the fibre cutting plates with which the block is faced.

For the purpose of the illustrative showing here, only one cutting station is shown and one cutting block, although, in practice, the structure may be duplicated as desired. Each cutting block embodies, broadly speaking, two elements, a back section 11 and a front section 11′. The back section 11 may be made of any desired material, but for the purpose of illustration is here shown as built up of a plurality of strips permanently secured together edge to edge by means of metallic cleats 12, 13 and 14, through which screws are passed into the several underlying strips for maintaining them in an assembled relation. The inner longitudinal edges of each of the cleats 12 and 14 are provided with tongues 12′ and 14′, respectively, while both outer edges of the cleat 13 are similarly formed after the manner shown in Figure 3, so that plates of fibre 15 and 15′, both of which are formed as shown in Figure 5 with laterally grooved edges 16, may be slipped in between the cleats, as shown in Figures 1 and 3, to form a facing for the block 11. The facing is preferably fibre, though, if desired, it may be of composition material, or the like.

It may be here stated that the plates 15 and 15′ are adapted to receive the wear and tear imposed upon the back of the section block by the head and tail knives. The wear and tear of the front knife is adapted to be taken by a front strip of material 17 mounted on a front section 11′.

Figure 6:
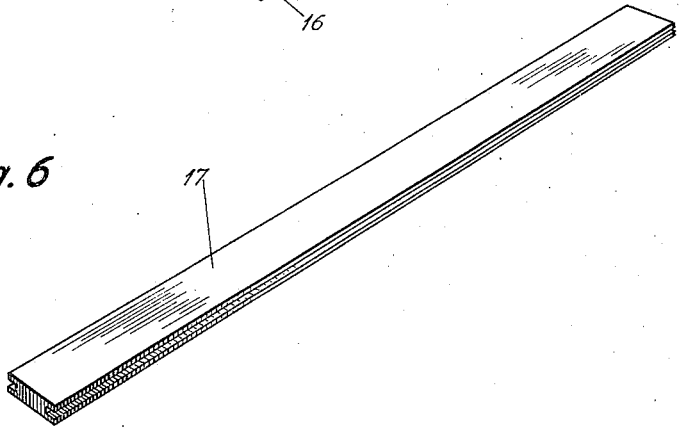
Figure 6 is a like view of a front strip of fibre adapted to be associated with two plates of the kind shown in Figure 5 to complete cutting surface.

Front section 11′ is in the form of square strip, preferably the same length as the back section 11, and this strip is adapted to abut the front edge of section 11 after the manner shown in Figures 1 and 2, and is adapted to underly and support the superimposed fibre 17 shown in Figure 6. In order that this fibre strip may be maintained in position when the parts are in assembled relation, both longitudinal edges of said strip 17 are channeled, as shown, and the front end of each cleat 12, 13 and 14 is provided with a tongue 18 adapted to fit in the channel on one edge of the strip, while the middle edging 19 extends along the front edge of a strip 17, as a tongue extending into the adjacent channel of said strip, and is secured to the front section 11′ by means of screws as shown.

The cutting tables of the machines of the character described are provided with upright angle plates 20, as shown in Figures 1 and 2, against which the books to be trimmed are stacked, and in assembling the present invention in operative position on the machine, I lay the back section 11 on the table with its rear edge against the angle plates 20, then position the front section 11′ at the front edge of the back section and force a hold rigidly against the angle plates 20 in an edgewise direction, by means of a holding screw 21. This holding screw is threaded through a bracket 22 secured at the outer edge of the table 10, so that when screw 21 is tightened, the back and front sections 11 and 11′ of the block will be firmly clamped in position. A small strip of metal 23 may be interposed between the end of the set screw 21 and the forward face of the front section 11′, to take the wear of the set screw off the front section.

When the parts are in the positions described and as shown in Figure 1, the books or other stacks of papers positioned on the block may be trimmed. The plates 15 and 15′ will take the wear of the head and tail knives while the front strip 17 will take the wear of the front knife. The edging 19 is preferably cut away at 24 so that the head and tail knives will not strike the metallic edging, or become dulled or broken by such contact.

As the trimming operation is proceeded with, with stack after stack of books or magazines, the cutting knives will wear or cut troughs in the plates 15 and 15′, but the block may be shifted from time to time in a lateral edgewise direction to present unmarred or uncut portions of the fibre plates to the knives. The whole block may be shifted, if desired, by loosening the set screw 21 and shifting the block slightly, but I preferably remove only the rear portion 11, utilizing pins 25, one of which is positioned at each end of the front section 11′, and which projects into holes in the tail to anchor the front section against movement when the back section is shifted.

I may also anchor the fibre strip 17 against shifting through the employment of small turn buttons 26, as shown in Fig. 1. In practice, the back section is preferably shifted along in a lateral direction to the left, as viewed in Figure 1, a little at a time, so that it partakes of the relative position shown in dotted lines in Figure 1. In this manner, substantially the entire surface of the fibre plates 15 and 15' may be used and said plates may be removed and turned end for end so as to obtain complete service. Moreover, they may be removed and inverted so that both faces of the plates may be employed.

It will, of course, be understood that in practice I may provide different sizes of blocks for books of widely varying sizes and that I may, otherwise, slightly modify the construction through the use of the equivalents without departing from the invention, which is to be understood as broadly novel as is commensurate with the appended claims.

What I claim is:

1. A cutting block for trimming machines, embodying a front section and a back section, said sections being mounted for relative, lateral adjustment, the front section being provided with a fibre facing for taking the wear of the front cutting knife and the back section being fibre faced for taking the wear of the head and tail knives.

2. A cutting block for trimming machines, embodying a front section and a back section, the front section being provided with a fibre facing for taking the wear of the front cutting knife and the back section being fibre faced for taking the wear of the head and tail knives, one of said sections being adjustable laterally with respect to the other to present uncut portions of the fibre facing thereof to the knives.

3. A cutting block for trimming machines, embodying a body portion provided with slides, and a fibre plate having complementary slides formed therein and adapted to cooperate with the slides of a body portion, whereby the fibre plate may be positioned on or removed from the body portion to act as a facing therefor for the purpose of taking the wear of the knives.

4. A cutting block for trimming machines embodying a front section and a back section, which sections are mounted for relative edgewise adjustment with respect to one another, guides on said sections, and fiber facing plates having guides adapted to cooperate with the guides of said section, whereby said plates may be relatively shifted with respect to one another or may be removed from said section.

5. A cutting block for trimming machines embodying a base member comprising a plurality of sections which are relatively adjustable in edgewise relation with respect to one another, and fiber facing plates detachably mounted on said sections.

6. A cutting block for trimming machines embodying a base member comprising a plurality of sections mounted for relative lateral adjustment, guides on said sections, and a fiber facing plate associated with at least one of said sections and having tongue and groove connections with said guides, whereby said facing plate may be slid into and out of cooperative relation with the guides and be mountably associated with the cutting block.

In testimony whereof, I have signed my name to this specification.

JOHN J. HALLORAN.